US012701532B2

(12) United States Patent
    Sundararajan et al.

(10) Patent No.: US 12,701,532 B2
(45) Date of Patent: Aug. 4, 2026

(54) MULTI-MEASUREMENT REPORTING PER REFERENCE SIGNAL

(71) Applicant: QUALCOMM Incorporated, San Diego, CA (US)

(72) Inventors: Jay Kumar Sundararajan, San Diego, CA (US); Alexandros Manolakos, Escondido, CA (US); Guttorm Ringstad Opshaug, Redwood City, CA (US); Sven Fischer, Nuremberg (DE); Renqiu Wang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/254,241

(22) PCT Filed: Dec. 23, 2021

(86) PCT No.: PCT/US2021/065087
    § 371 (c)(1),
    (2) Date: May 24, 2023

(87) PCT Pub. No.: WO2022/150202
    PCT Pub. Date: Jul. 14, 2022

(65) Prior Publication Data
    US 2024/0007988 A1      Jan. 4, 2024

(30) Foreign Application Priority Data
    Jan. 5, 2021     (GR) ............................... 20210100006

(51) Int. Cl.
    *H04W 64/00*        (2009.01)
    *H04L 5/00*         (2006.01)

(52) U.S. Cl.
    CPC ........... *H04W 64/00* (2013.01); *H04L 5/0051* (2013.01)

(58) Field of Classification Search
    CPC ............................ H04W 64/00; H04L 5/0051
    See application file for complete search history.

(56) References Cited

U.S. PATENT DOCUMENTS

| | | | |
|---|---|---|---|
| 2017/0288897 A1 | 10/2017 | You et al. | |
| 2020/0396710 A1 | 12/2020 | Wigren et al. | |
| 2023/0138181 A1* | 5/2023 | Huang ................... | G01S 5/0036 370/329 |

FOREIGN PATENT DOCUMENTS

| | | |
|---|---|---|
| CN | 105745966 A | 7/2016 |
| CN | 110012536 A | 7/2019 |

(Continued)

OTHER PUBLICATIONS

International Search Report and Written Opinion—PCT/US2021/065087—ISA/EPO—Apr. 8, 2022.

*Primary Examiner* — Sam Bhattacharya
(74) *Attorney, Agent, or Firm* — Thien T. Nguyen

(57) ABSTRACT

A method of reporting measurements of an uplink positioning reference signal includes: receiving, at a base station, the uplink positioning reference signal from a user equipment; determining, at the base station, a plurality of measurement values of the uplink positioning reference signal, each of the plurality of measurement values being of a same type of measurement, and corresponding to the uplink positioning reference signal; and sending, from the base station to a server, a report including the plurality of measurement values of the uplink positioning reference signal and at least one indication that the plurality of measurement values corresponds to a same uplink positioning reference signal.

30 Claims, 9 Drawing Sheets

(56) References Cited

FOREIGN PATENT DOCUMENTS

| CN | 111033292 | A | 4/2020 |
| CN | 111373277 | A | 7/2020 |
| EP | 3726896 | A1 | 10/2020 |

* cited by examiner

800

| Index | | | Measure-ment value | Measure-ment beam info (PRS-ID) | Time-stamp |
|---|---|---|---|---|---|
| Antenna element | Path | Measurement type (RSRP, Rx-Tx, ToA, AoA) | | | |
| 1 | 1 | 1 | RSRP11 | Resource Set 1 (RS1) | $t_1$ |
| 1 | 1 | 2 | Rx-Tx | RS1 | $t_1$ |
| 2 | 1 | 1 | RSRP21 | RS1 | $t_1$ |
| 2 | 1 | 2 | Rx-Tx | RS1 | $t_1$ |
| 1 | 2 | 1 | RSRP12 | RS1 | $t_1$ |
| 1 | 2 | 2 | Rx-Tx1 | RS1 | $t_1$ |
| 2 | 2 | 1 | RSRP22 | RS1 | $t_1$ |
| 2 | 2 | 2 | Rx-Tx1 | RS1 | $t_1$ |
| | 1 | 1 | RSRPavg | RS1 | $t_1$ |
| | 2 | 1 | RSRPavg | RS1 | $t_1$ |
| 1 | | | RSRP11 | RS1 | $t_1$ |
| 2 | | | RSRP21 | RS1 | $t_1$ |

810 · 840 · 850 · 860

811, 812, 813, 814, 815, 816, 817, 818, 821, 822, 831, 832

900

| Index | | | Measure-ment value | Measure-ment beam info (PRS-ID) | Time-stamp |
|---|---|---|---|---|---|
| Antenna element | Path | Measurement type (RSRP, Rx-Tx, ToA, AoA) | | | |
| 1 | 2 | 2 | Rx-Tx1 | RS1 | $t_1$ |
| 2 | 2 | 2 | Rx-Tx1 | RS1 | $t_1$ |
| 1 | 1 | 2 | Rx-Tx | RS1 | $t_1$ |
| 2 | 1 | 2 | Rx-Tx | RS1 | $t_1$ |
| 1 | 3 | 2 | Rx-Tx2 | RS1 | $t_1$ |
| 2 | 3 | 2 | Rx-Tx2 | RS1 | $t_1$ |

911
912
913
914
915
916

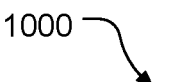

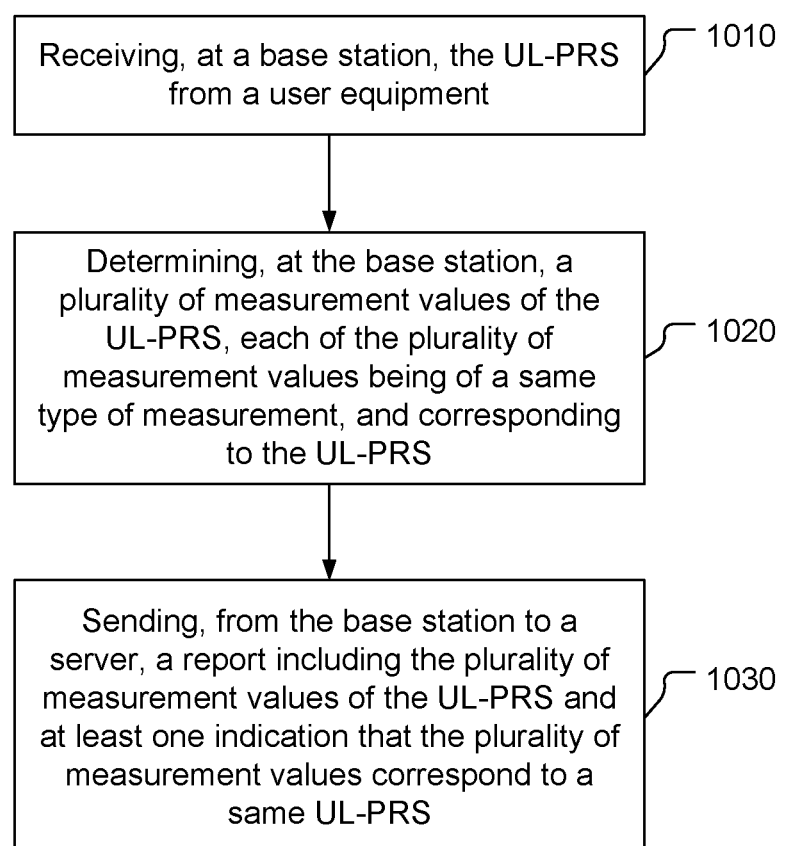

Receiving, at a base station, the UL-PRS from a user equipment — 1010

Determining, at the base station, a plurality of measurement values of the UL-PRS, each of the plurality of measurement values being of a same type of measurement, and corresponding to the UL-PRS — 1020

Sending, from the base station to a server, a report including the plurality of measurement values of the UL-PRS and at least one indication that the plurality of measurement values correspond to a same UL-PRS — 1030

FIG. 10

MULTI-MEASUREMENT REPORTING PER REFERENCE SIGNAL

CROSS-REFERENCE TO RELATED APPLICATIONS

This application is the National Stage of International Application No. PCT/US2021/065087, filed Dec. 23, 2021, entitled "MULTI-MEASUREMENT REPORTING PER REFERENCE SIGNAL," which claims the benefit of Greek patent application No. 20210100006, filed Jan. 5, 2021, entitled "MULTI-MEASUREMENT REPORTING PER REFERENCE SIGNAL," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example base station includes: a transceiver; a memory; and one or more processors communicatively coupled to the transceiver and the memory and configured to: receive an uplink positioning reference signal from a user equipment via the transceiver; determine a plurality of measurement values of the uplink positioning reference signal, each of the plurality of measurement values being of a same type of measurement, and corresponding to the uplink positioning reference signal; and send, via the transceiver to a server, a report including the plurality of measurement values of the uplink positioning reference signal and at least one indication that the plurality of measurement values corresponds to a same uplink positioning reference signal.

An example method of reporting measurements of an uplink positioning reference signal includes: receiving, at a base station, the uplink positioning reference signal from a user equipment; determining, at the base station, a plurality of measurement values of the uplink positioning reference signal, each of the plurality of measurement values being of a same type of measurement, and corresponding to the uplink positioning reference signal; and sending, from the base station to a server, a report including the plurality of measurement values of the uplink positioning reference signal and at least one indication that the plurality of measurement values corresponds to a same uplink positioning reference signal.

Another example base station includes: means for receiving an uplink positioning reference signal from a user equipment; means for determining a plurality of measurement values of the uplink positioning reference signal, each of the plurality of measurement values being of a same type of measurement, and corresponding to the uplink positioning reference signal; and means for sending, to a server, a report including the plurality of measurement values of the uplink positioning reference signal and at least one indication that the plurality of measurement values corresponds to a same uplink positioning reference signal.

An example non-transitory, processor-readable storage medium includes processor-readable instructions configured to cause one or more processors of a base station, in order to facilitate reporting measurements of an uplink positioning reference signal, to: receive the uplink positioning reference signal from a user equipment; determine a plurality of measurement values of the uplink positioning reference signal, each of the plurality of measurement values being of a same type of measurement, and corresponding to the uplink positioning reference signal; and send, to a server, a report the plurality of measurement values of the uplink positioning reference signal and at least one indication that the plurality of measurement values corresponds to a same uplink positioning reference signal.

BRIEF DESCRIPTION OF THE DRAWINGS

FIG. 10 is a block flow diagram of a method of reporting measurements of an uplink positioning reference signal.

DETAILED DESCRIPTION

Figure 1:
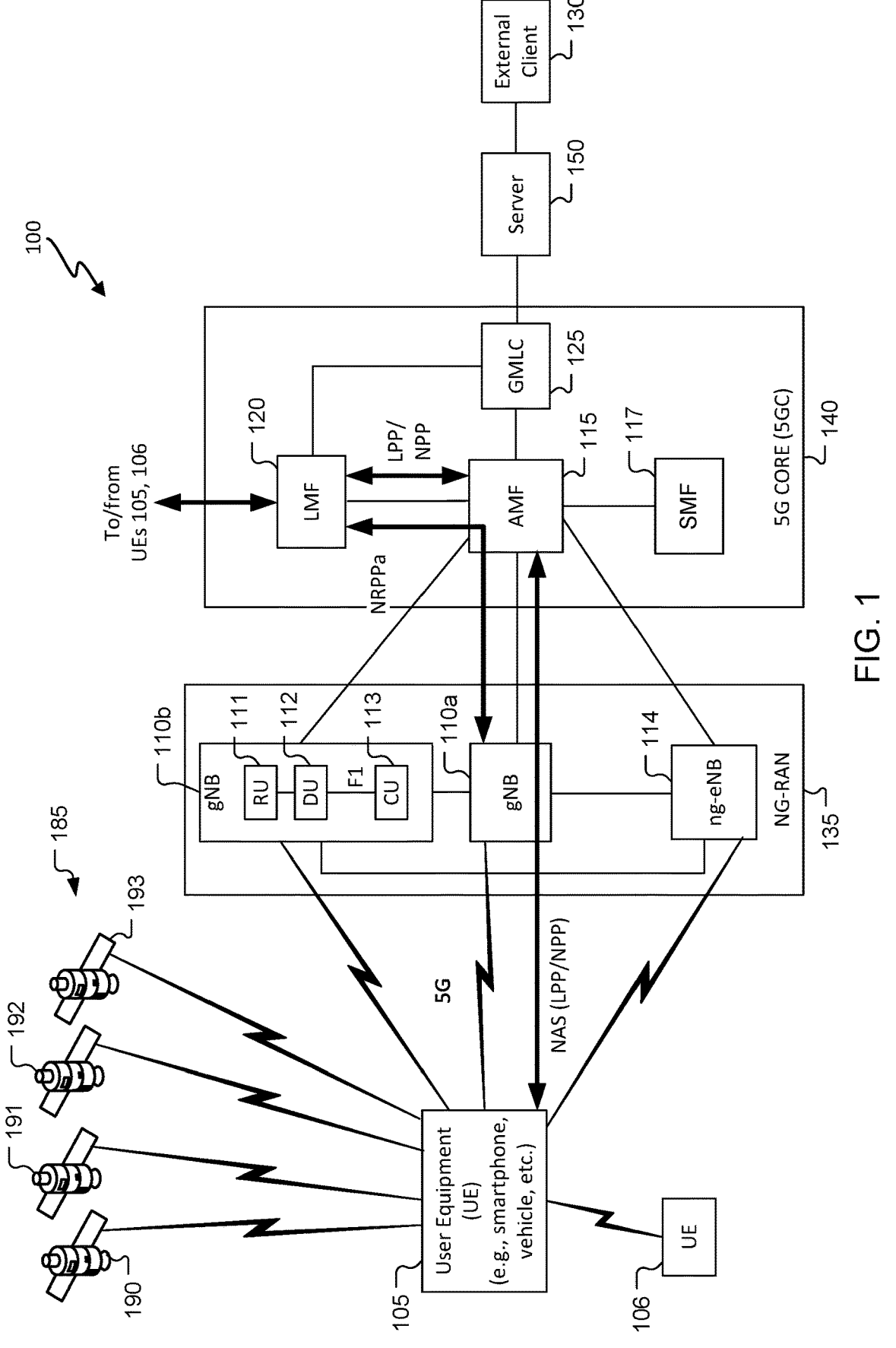
FIG. 1 is a simplified diagram of an example wireless communications system.

Techniques are discussed herein for reporting measurements of uplink positioning reference signals. For example, an uplink positioning reference signal (UL-PRS) is sent from a user equipment (UE) to a base station. The UL-PRS may take multiple paths from the UE to the base station, e.g., a direct, line-of-sight (LOS) path, and/or one or more non-line-of-sight (NLOS) paths involving one or more reflections of the UL-PRS. The base station measures the one or more arrivals of the UL-PRS with one or more antenna elements to yield one or more measurement values. The one or more measurement values correspond to one or more measurement types (e.g., power, relative timing, time of arrival, angle of arrival). The base station determines multiple measurement values for the same type of measurement for the same UL-PRS, and possibly multiple measurement values for the same measurement type for each of multiple measurement types for the same UL-PRS. The base station reports the multiple measurements for the same measurement type for the same UL-PRS to a server. The server may use the measurement values, e.g., from multiple base stations, to determine information to improve a location estimate of the user equipment. The server may use the measurement values to determine a multipath channel profile and/or a multi-antenna-element channel profile (e.g., a multi-antenna-element, multipath channel profile). These are examples, and other examples may be implemented.

Items and/or techniques described herein may provide one or more of the following capabilities, as well as other capabilities not mentioned. Multipath channel profiles and/or multi-antenna-element channel profiles may be provided to a server from one or more base stations and/or determined by a server based on reference signal measurement information provided to the server by the base stations. Positioning accuracy of a user equipment may be improved, particularly in non-line-of-sight conditions between the user equipment and a base station. Based on channel profile information provided by one or more base stations, a server may learn typical characteristics of measurement errors. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS)

Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS (Synchronization Signals) or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
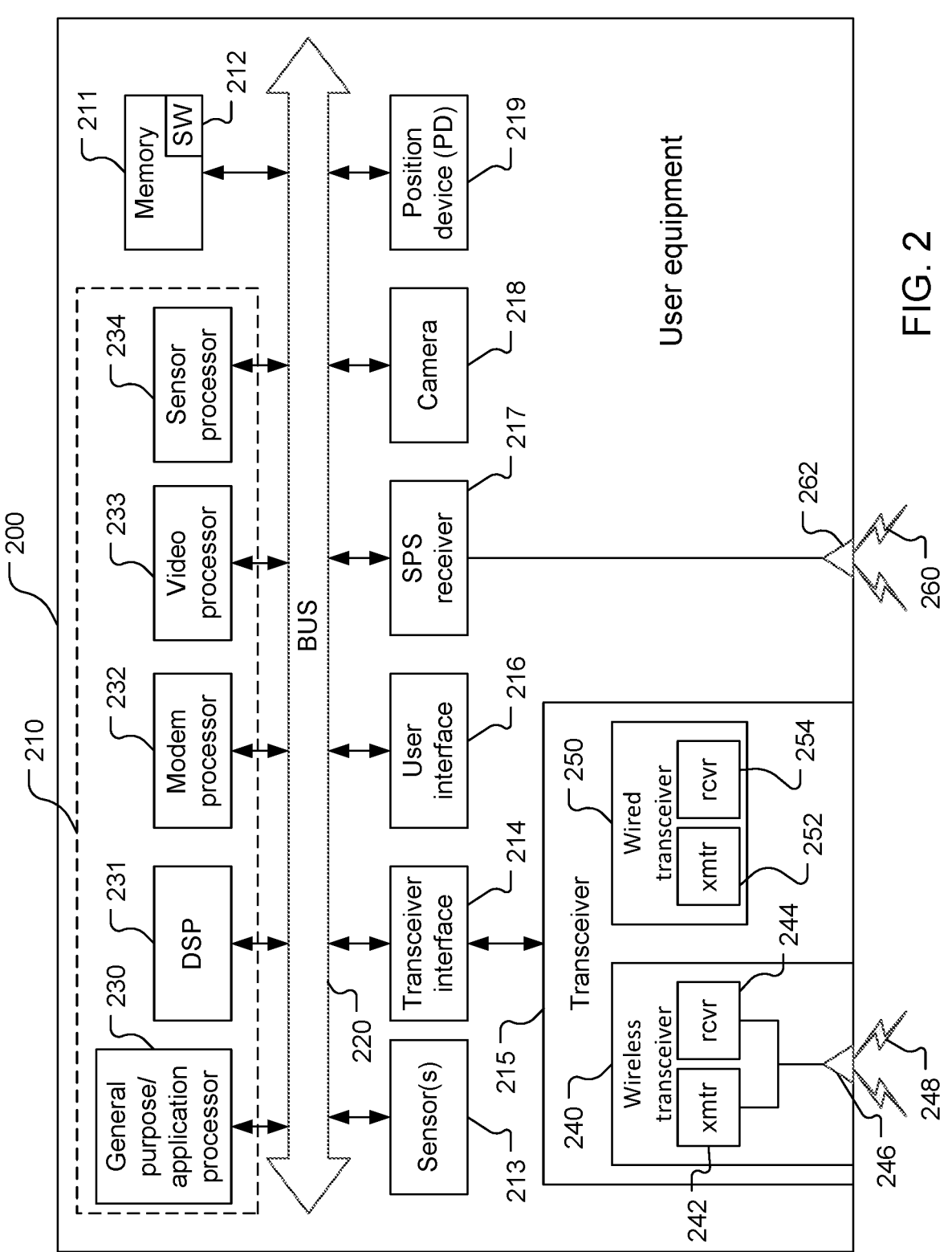
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
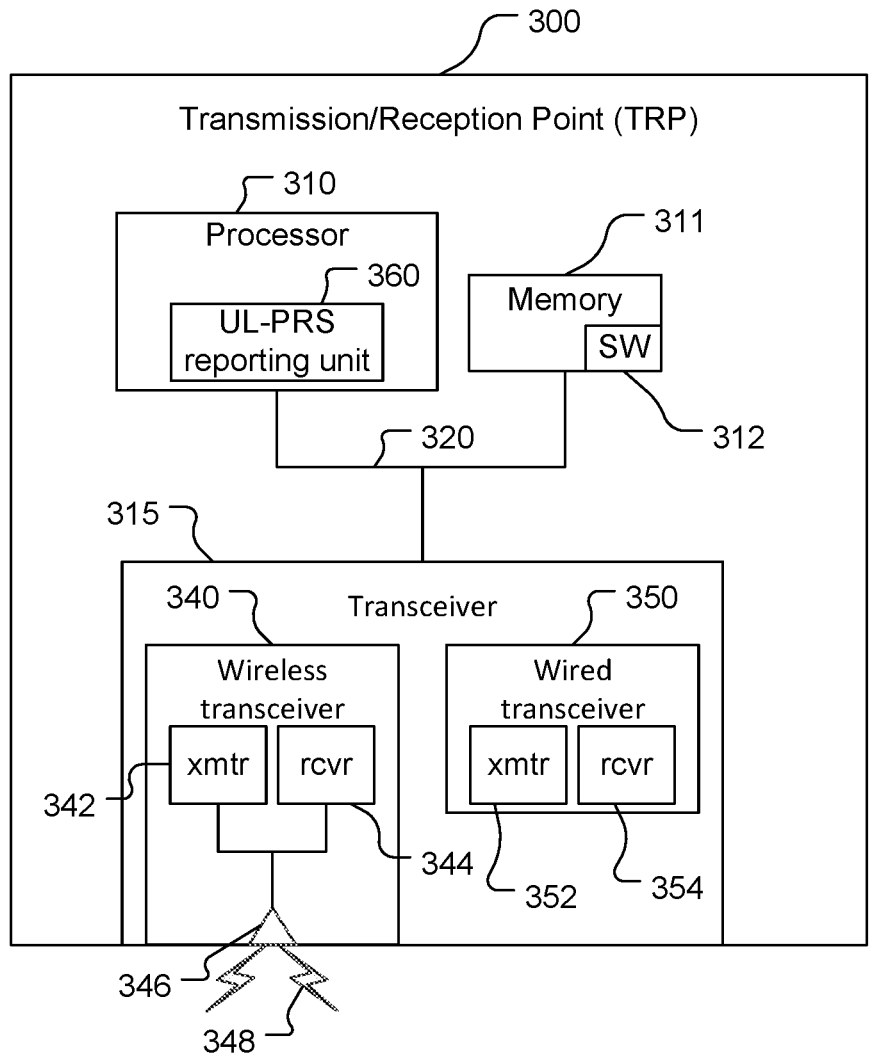
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
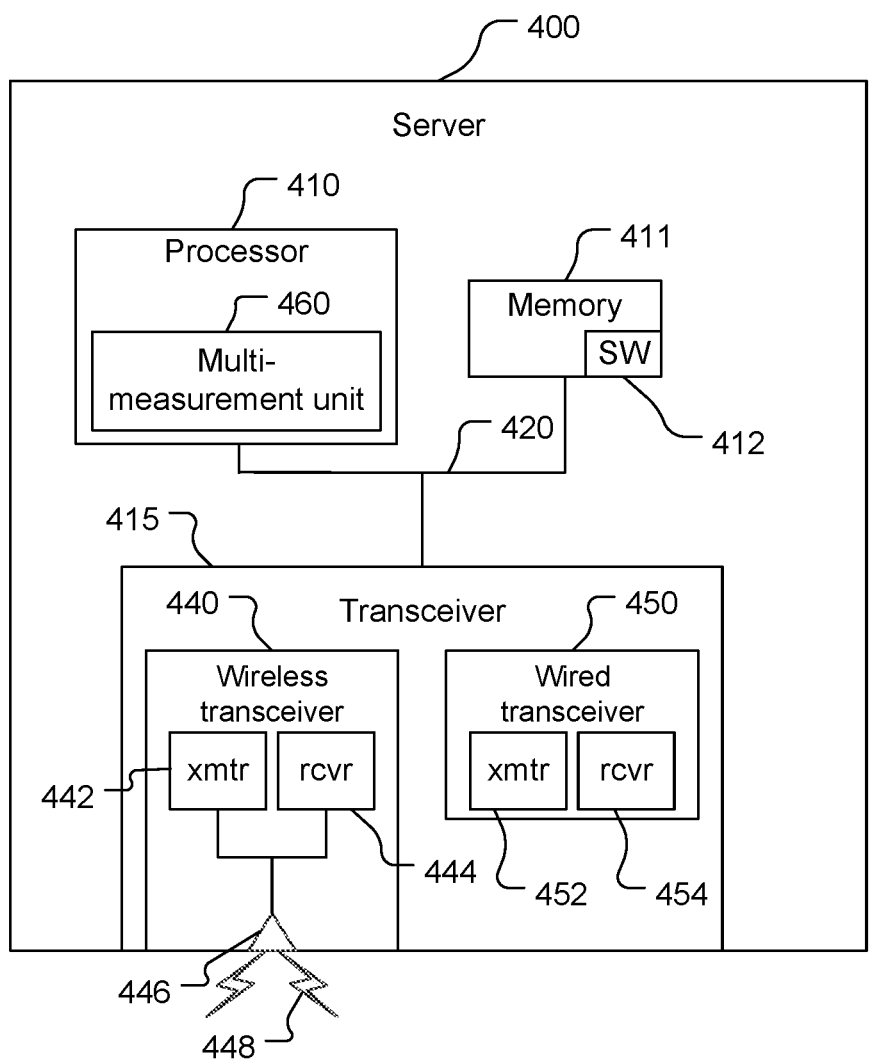
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Reporting Multiple Measurements Per Uplink Reference Signal

Various techniques may be implemented to obtain and report multiple measurements for each of one or more uplink positioning reference signals from a UE. Multiple channel estimation measurements, e.g., magnitude and phase measurements, may be made by a base station of incoming signals (e.g., in the form of power and timing measurements). The base station may also make other measurements, such as AoA and ToA, for incoming signals and a multipath channel profile and/or a multi-antenna-element channel profile may be reported by the base station to a server (e.g., a multi-antenna-element, multipath channel profile including one or more path channel profiles for each of multiple antenna-element channel profiles). The server may use the profile information from a base station, and perhaps profile information from more than one base station, to improve accuracy of position information, e.g., by improving the determination of a first arrival time of a reference signal and/or by improving determination of whether a reference signal was received by a line-of-sight (LOS) path or a non-line-of-sight (NLOS) path.

In the NR Positioning Protocol A standard (technical specification 38.455) in 5G, a base station can report positioning-related measurements to a location server. A measurement report includes options to report measurement items such as SRS RSRP, gNB-side Rx-Tx, AoA, and RTOA (Relative Time Of Arrival). The gNB-side Rx-Tx is a time difference between a reception time of a UL-PRS at the gNB relative to a reference transmission time of a DL-PRS by the gNB. The measurement report may include one or more TRP measurement result items, each in accordance with the following:

```
TrpMeasurementResult : := SEQUENCE {SIZE (1 . . maxnoPosMeas) OF
    TrpMeasurementResultItem
TrpMeasurementResultItem : := SEQUENCE {
    measureResultsValue
    timestamp
    measurementQuality
    measurementBeamInfo
```

Thus, one or more measurement items may be included in the measurement report. For each measurement item, a measurement value and a timestamp are provided, with the timestamp indicating a coarse time (e.g., on the order of milliseconds) at which the corresponding measurement was taken by the TRP 300. Optionally, an indication of the measurement quality and an indication of the measurement beam information may be provided. The measurement beam information identifies the reference signal measured, e.g., a UL-PRS ID such as a PRS resource ID or a PRS resource set ID).

Referring again to FIG. 3, the processor 310 (possibly in conjunction with the memory 311 and, as appropriate, the transceiver 315) includes a UL-PRS reporting unit 360. The UL-PRS reporting unit 360 is configured to measure UL-PRS from the UE 200, possibly to process measurements (e.g., sum, average, determine first arrival of the UL-PRS, etc.) and to report multiple measurements for each of one or more UL-PRS (although perhaps not multiple measurements for every received UL-PRS). For example, the antenna 346 may comprise multiple antenna elements that may be used to steer an antenna beam and/or to receive each UL-PRS separately, possibly with a UL-PRS having different phases at different antenna elements (e.g., if the UL-PRS is incident upon the antenna 346 at an angle off antenna boresight). The antenna 346 may be a single antenna with one or more antenna elements or the antenna 346 may comprise multiple separate antennas each comprising one or more antenna elements. Thus, the antenna elements discussed herein may be part of a single antenna or parts of multiple antennas. The UL-PRS reporting unit 360 is discussed further below, and the description may refer to the processor 310 generally, or the TRP 300 generally, as performing any of the functions of the UL-PRS reporting unit 360. The TRP 300 is configured to perform the functions of the UL-PRS reporting unit 360.

The TRP 300 is configured to receive an SRS for positioning from the UE 200 and to determine one or more measurement items of the SRS for positioning (i.e., the UL-PRS). A value of a measurement item may be determined corresponding to each of one or more antenna elements and/or for each of one or more arrivals of the UL-PRS (different arrivals of a single UL-PRS corresponding different paths (routes) that the different arrivals of the single UL-PRS traveled). Also or alternatively, a measurement item value may be determined as a combination of multiple UL-PRS portions received by multiple antenna elements for a particular arrival of the UL-PRS, e.g., a sum of the measurement item values of the first arrival of the UL-PRS received at the antenna elements and/or an average of the measurement item values.

The TRP 300 may be configured to estimate a channel response and derive a time of arrival of a first-arriving channel path, i.e., a time when the UL-PRS first arrives at the TRP 300, with the UL-PRS (here, the same, single UL-PRS) potentially arriving at the TRP 300 at multiple times due to transit from the UE 200 to the TRP 300 along multiple paths (e.g., due to reflections of the UL-PRS). The channel response may be determined in terms of magnitude and phase (timing) of the received UL-PRS. The TRP 300 may determine the ToA of the UL-PRS by correlating a pattern of the UL-PRS with incoming signals, eliminating any correlation peak that is below a threshold magnitude, and determining the ToA of the UL-PRS as the time of the earliest correlation peak that is above the threshold. The TRP 300 may use this ToA to estimate the gNB-side Rx-Tx time difference as the ToA relative to a transmission time of a reference DL-PRS by the TRP 300. In NLOS conditions, or an LOS condition with the LOS path being attenuated, a first arrival of the UL-PRS may be below the threshold power, resulting in an NLOS path being used for the ToA.

The TRP 300 may determine one or more measurement item values for each of one or more arrivals of the UL-PRS. For example, a value of RSRP may be determined corresponding to each antenna element for each of one or more arrivals of the UL-PRS. Also or alternatively, an RSRP may be determined as a combination of multiple UL-PRS portions received by multiple antenna elements for a particular arrival of the UL-PRS, e.g., a sum of the RSRPs of the first arrival of the UL-PRS received at the antenna elements and/or an average of the RSRPs. The TRP 300 may also or alternatively determine one or more Rx-Tx values, one or more AoA values, one or more RTOA values, and/or one or more other values based on the received UL-PRS. To determine the AoA, the processor 310 may use the channel estimates (at least the timing/phase portions of the channel estimates) from multiple antenna elements, with phase differences between the antenna elements being used to determine a wavefront direction, and thus the AoA.

As discussed further below, the UL-PRS reporting unit 360 is configured to report multiple measurements per UL-PRS. Reporting a channel multipath profile, i.e., multiple measurement items (e.g., magnitude and delay) for each of one or more paths, may help provide information that the server 400 may use to better estimate a true first arrival time of a reference signal, and thus better determine a location estimate of a UE. Reporting the channel response from multiple antenna elements may help the server 400 better estimate an AoA of a UL-PRS, and thus better determine a location estimate of a UE.

Referring also to FIG. 4, the processor 410 (possibly in conjunction with the memory 411 and, as appropriate, the transceiver 415) includes a multi-measurement unit 460. The multi-measurement unit 460 is configured to use multiple measurements of a single UL-PRS path and/or multiple measurements of the same path corresponding to multiple antenna elements from a TRP 300, possibly in combination with one or more measurements from one or more other TRPs to improve the accuracy of one or more measurements, e.g., AoA, ToA, of a UL-PRS which may in turn improve accuracy of a location estimate of a target UE. The multi-measurement unit 460 is discussed further below, and the description may refer to the processor 410 generally, or the server 400 generally, as performing any of the functions of the multi-measurement unit 460. The server 400 is configured to perform the functionality of the multi-measurement unit 460.

The multi-measurement unit 460 may coordinate measurements to determine accurate LOS measurements. For example, the multi-measurement unit 460 may analyze the AoA from second and third TRPs to determine a location estimate of a UE, and use that location estimate to confirm or reject the AoA determined by a first TRP for the UE depending on whether the location estimate is consistent with the AoA determined by the first TRP and the location of the first TRP (e.g., that a line along the AoA from the first TRP intersects with, or nearly so, the location estimate of the UE). As another example, a correlation peak that is below a magnitude threshold may be determined to be the first arrival of a UL-PRS at the first TRP if a distance determined using the time of the correlation peak, and a location of the first TRP, corresponds to the location estimate of the UE based on measurements from the second and third TRPs.

Figure 5:
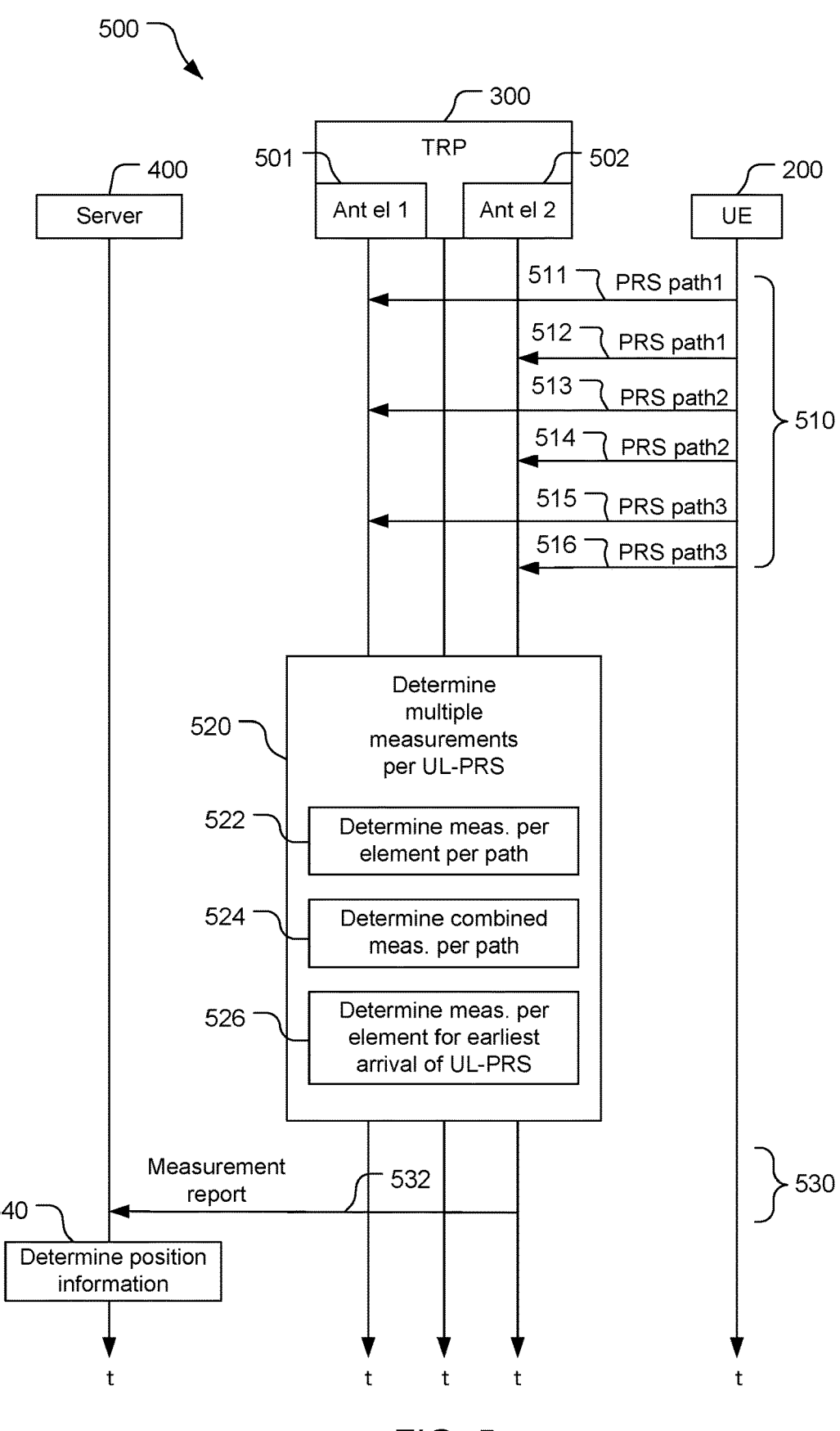
FIG. 5 is a signaling and process flow for determining and reporting uplink signal measurements.
Figure 6:
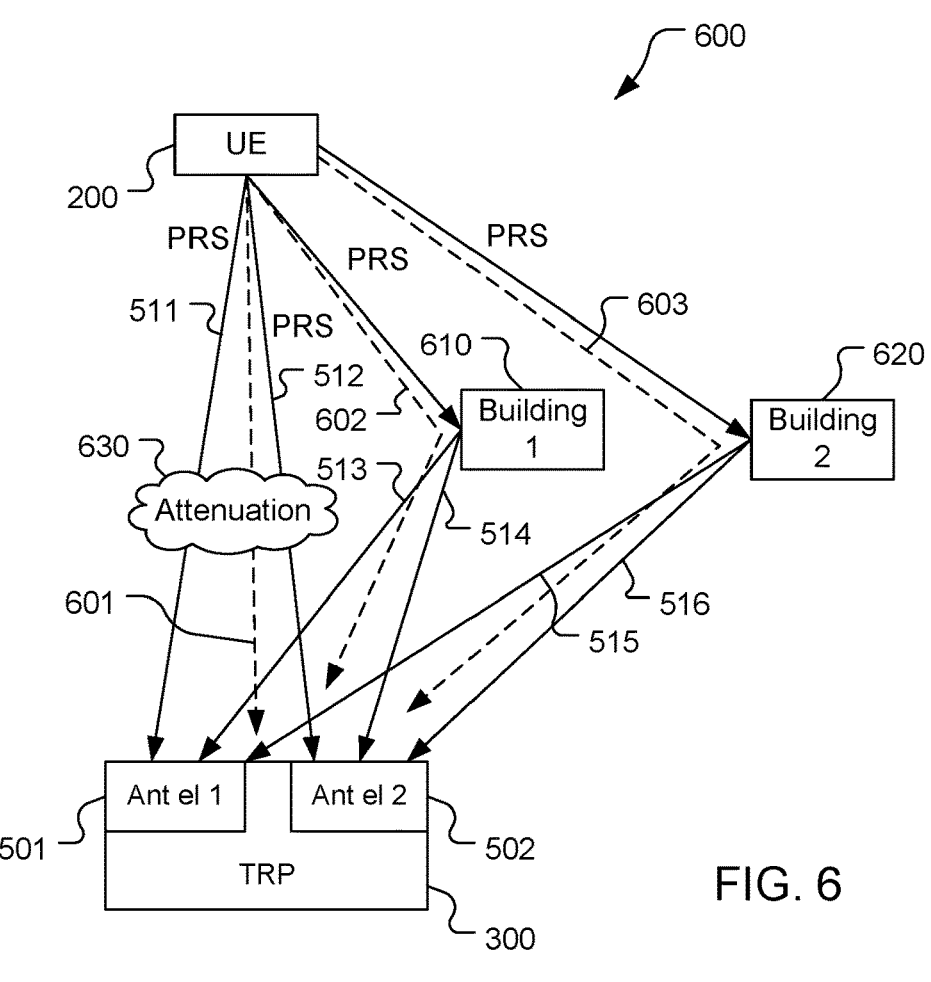
FIG. 6 is an example layout of a user equipment, a transmission/reception point, and buildings, with transmission and reception of a positioning reference signal.

Referring to FIG. 5, with further reference to FIG. 6, a signaling and process flow 500 for multiple measurement reporting per reference signal, and possible use of reported measurements, includes the stages shown. The flow 500 is an example, as stages may be added, rearranged, and/or removed. The flow 500 corresponds to an example layout 600, shown in FIG. 6, of the UE 200 (or a simplified version of the UE 200, although referred to herein as the UE 200), the TRP 300, a building 610, and a building 620. For illustrative purposes, the TRP 300 is shown comprising two antenna elements, a first antenna element 501 and a second antenna element 502. A simplified version of the UE 200 may omit one or more of the components shown in FIG. 2, e.g., the PD 219, one or more of the sensor(s) 213, the SPS receiver 217 and the SPS antenna 262, and/or the camera 218.

At stage 510, the UE 200 sends a single UL-PRS signal to the TRP 300. The UL-PRS signal may be transmitted in numerous directions and for reception by multiple recipients (e.g., any recipient), and thus the single UL-PRS signal is represented by multiple lines, each corresponding to a different path between the UE 200 and a respective one of the antenna elements 501, 502. As shown, PRS 511 and PRS 512 travel a first path 601 to the antenna elements 501, 502, respectively, PRS 513, and PRS 514 travel a second path 602 to the antenna elements 501, 502, respectively, and PRS 515 and PRS 516 travel a third path 603 to the antenna elements 501, 502, respectively. The paths 601, 602, 603 extend from the UE 200 to the TRP 300, but are shown ending short of the TRP 300 in order to simplify the figure. The first path 601 is a direct, LOS, path between the UE 200 and the TRP 300, although there is some attenuation 630 in the first path 601, e.g., due to interference and/or clutter, but that allows the PRS 511, 512 to travel directly (albeit attenuated) to the TRP 300. The second and third paths 602, 603 involve reflections off of the buildings 610, 620, respectively. FIG. 6 is not to scale, for example with the separation of the antenna elements 501, 502 shown larger than actual to facilitate illustration. The angles of arrival of the paths 601, 602, 603 to the respective antenna elements 501, 502 will be the same, for practical purposes, although FIG. 6 shows the angles of arrival to be significantly different, e.g., due to the exaggeration of the separation of the antenna elements 501, 502.

Figure 7:
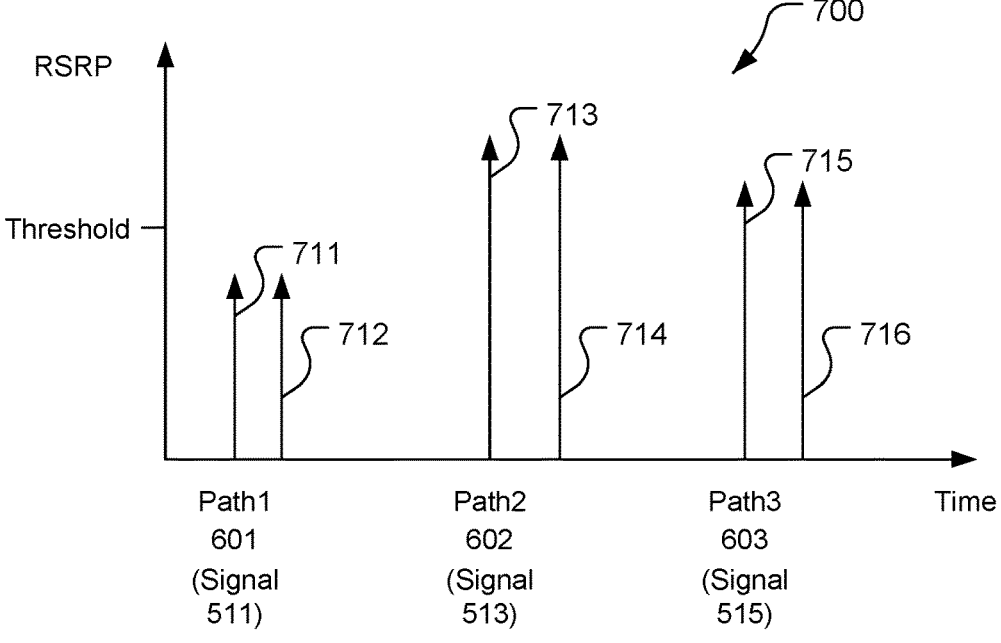
FIG. 7 is a plot of measured power of positioning reference signal portions received by different antenna elements shown in FIG. 6.

At stage 520, the TRP 300 determines multiple measurements of the UL-PRS sent by the UE 200. The processor 310 may determine one or more measurement items for each of the PRS paths for each of the antenna elements 501, 502 at sub-stage 522, and/or may determine one or more combined measurement items for each of different paths for a combination of the antenna elements 501, 502 at sub-stage 524, and/or may determine one or more measurement items for a particular path (e.g., the earliest-arrival path) for each of the antenna elements 501, 502 at sub-stage 526. For example, referring also to FIG. 7, at sub-stage 522 the processor 310 may correlate the incoming UL-PRS signals 511, 513, 515 received by the antenna element 501 to determine RSRP values 711, 713, 715 for the UL-PRS signals 511, 513, 515 as shown in a plot 700 of RSRP versus time. From the plot 700, and the transmit time of each of one or more corresponding transmitted signals, the processor 310 may determine the gNB Rx-Tx time corresponding to each of the signals 511, 513, 515, and thus corresponding to each of the paths 601, 602, 603. The processor 310 may determine similar RSRP values 712, 714, 716 for the signals 512, 514, 516 received by the antenna element 502 and/or one or more other antenna elements not shown. At sub-stage 524, the processor 310 may combine measurements for the same path from multiple antenna elements for each of multiple signal arrivals (corresponding to multiple paths). Thus, multiple combined measurements, one for each of multiple paths analyzed, may be determined from the single UL-PRS. For example, the processor 310 may combine (e.g., average, sum, and/or other combination) measurements corresponding to the same arrival time, e.g., within a window of time of each other. The processor 310 may, for example, determine an average and/or a sum of the RSRPs measurement values corresponding to the same path across the antenna elements 501, 502. For example, the processor 310 may average the RSRP measurement values of the earliest-arriving signal that has an RSRP at least as strong as a threshold RSRP, in this example, averaging the RSRP of the signals 513, 514 of the second path 602 (assuming the RSRP values at the antenna element 502 are similar to the RSRP values at the antenna element 501 as shown in FIG. 7). At sub-stage 526, the processor 310 may determine a measurement item value for the same measurement item (e.g., RSRP, gNB Rx-Tx) for each of multiple antenna elements, here the antenna elements 501, 502, for a particular one of the paths, e.g., the earliest arriving path (i.e., the earliest arrival of the UL-PRS sent by the UE 200). The processor 310 may look for the earliest arrival of the UL-PRS within a time window, and/or may determine the measurement if the signal meets one or more criteria such as that the RSRP of signal is at least a threshold magnitude, and not determine the measurement otherwise. Thus, the processor 310 may determine multiple measurement values for the same measurement item for the same path for a single UL-PRS as received by different antenna elements.

Figure 8:
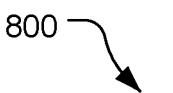
FIG. 8 is an example of a positioning information report from a base station to a server.

At stage 530, the processor 310, in particular the UL-PRS reporting unit 360, sends a measurement report 532 to the server 400 reporting multiple measurement values for the same measurement item corresponding to the single UL-PRS. For example, as shown in FIG. 8, a measurement report 800 is an example of the measurement report 532 and includes indexes 810, measurement values 840, measurement beam information 850, and timestamps 860. Each of the indexes 810 of entries 811, 812, 813, 814, 815, 816, 817,

818 indicates an antenna element that received the UL-PRS, a path that the UL-PRS traveled (corresponding to an arrival time of the UL-PRS), and a measurement type (e.g., with respective coded entries of 1 for RSRP, 2 for Rx-Tx, 3 for ToA, and 4 for AoA). The indexes 810 may be provided in a TRPMeasurementResultItem field of a measurement report. The index values may be optional, e.g., if the TRP 300 and the server 400 have a predetermined order of measurement values in the report, e.g. as specified by an industry standard, as agreed to by the TRP 300 and the server 400, or as instructed by the server 400 (the multi-measurement unit 460), e.g., in a TRPMeasurementQuantitiesList-Item field of a measurement report request from the server 400 to the TRP 300. For example, the index values may be omitted for the entries 811-818 if the TRP 300 and the server 400 know that the entries 811-818 will contain RSRP and Rx-Tx values, in alternating fashion, for the antenna element 501 and the path 601, then the antenna element 502 and the path 601, then the antenna element 502 and the path 601, then the antenna element 502 and the path 602. An existing NRPPa protocol may thus be used to convey a multipath channel profile for multiple antenna elements, e.g., by transmitting multiple measurement result items in a configured or predefined sequence based on a single UL-PRS (SRS for positioning). As shown in the example measurement report 800, the measurement values 840 include multiple values of RSRP and multiple values of Rx-Tx in the entries 811-818, one for each combination of the antenna elements 501, 502 and the paths 601, 602 (e.g., RSRP is provided for each antenna element-path pair). Further, multiple measurement item values are provided for RSRP in entries 821, 822 for the paths 601, 602. In this example, the RSRP values in the entries 821, 822 are average RSRP values determined by averaging the RSRP values determined from the signals received at both the antenna elements 501, 502 for each of the paths 601, 602 (i.e., the corresponding arrivals of the UL-PRS, here the UL-PRS 511, 512, and the UL-PRS 513, 514). Also shown in the example measurement report 800, entries 831, 832 include multiple values of RSRP corresponding to the antenna element 501, 502 respectively, for an unspecified (in the measurement report 800), but implicitly agreed-to arrival of the UL-PRS (corresponding to the path) such as the earliest arrival of the UL-PRS at each of the antenna elements 501, 502. The arrival (corresponding to the path) may be specified explicitly, e.g., as shown in the entries 831, 832.

Figure 9:
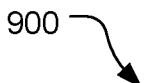
FIG. 9 is another example of a positioning information report from a base station to a server, with an order of reported measurements ordered based on values of another measurement.

The measurement report 532 may take a variety of forms. For example, measured values provided in the measurement report 532 may be ordered based on the values of a different measured quantity. The measurement report 532 may, for example, provide time of arrival measurements in order corresponding to respective power of received signals. Thus, a ToA of a signal with the highest received power may be listed first in the measurement report, even though that ToA may be after another ToA in the measurement report that corresponds to a signal with a lower received power. The values of the different measured quantity may or may not be included in the measurement report. For example, referring also to FIG. 9, in an example measurement report 900, entries 911, 912, 913, 914, 915, 916 are ordered in accordance with received power level, from highest received power level to lowest received power level. Thus, in this example, the entries 913, 914 are after the entries 911, 912 because the received power level over the second path 602 is higher than the received power level over the first path 601. In this way, without explicitly reporting a particular measurement type (in this example, received power), some indication of the relative value of the measurement type is provided (in this case, relative received power).

The measurement beam information 850 and the timestamp 860 identifies the UL-PRS from which the measurement values 840 were determined. The measurement beam information 850 includes a PRS-ID such as a PRS resource ID and/or a PRS resource set ID. The timestamp 860 indicates a time of measurement yielding the respective measurement value 840. For example, the timestamp 860 may have a granularity of several milliseconds (e.g., a value between 2 ms and 5 ms). The same measurement beam information 850 for multiple measurement values 840, or the same timestamp 860 for multiple measurement values 840, or both the same measurement beam information 850 and the same timestamp 860 for multiple measurement values, may indicate that the measurement values correspond to a single UL-PRS.

At stage 540, the server 400 determines position information. For example, the processor 410 uses measurement values from the measurement report 532 to determine a location estimate for the UE 200. The processor 410 may use measurement reports from multiple TRPs 300 to improve the accuracy of the position information, e.g., using measurements that agree with each other and discarding or ignoring measurements that do not agree with one or more other measurements. The processor 410 may be able to use information that would be discarded, e.g., the RSRP values 711, 712, and use these measurements if they agree with other information, e.g., from one or more other TRPs 300. For example, if a range based on the arrival times of the signals leading to the RSRP values 711, 712 agrees with a location estimate of the UE 200 based on measurements from other TRPs 300, then the RSRP values 711, 712 and/or other measurements of the signals 511, 512 may be used instead of ignored. As another example, if an AoA determined by the TRP 300 for the UE 200 would place the UE 200 along a line that is away from a location estimate for the UE 200 based on measurements from multiple other TRPs, then the AoA determined would not agree with the other measurements and may be discarded or ignored. As another example, multipath information from a single TRP 300 can be used to determine outlier information, e.g., if a ToA disagrees with an AoA and/or if an AoA to the UE 200 and/or a range to the UE 200 changes suddenly beyond expectation (e.g., jumps when the UE 200 is stationary or jumps more than is consistent with recent history of movement). Also or alternatively, the position information may be determined by an entity other than the server 400, e.g., a UE and/or a TRP. The server 400, and/or other entity, may employ a consistency algorithm to determine whether data are consistent or anomalous. Also or alternatively, the server 400 may employ machine learning (e.g., a neural network) to the measurement report information (e.g., based on training data) from one or more TRPs to determine position information for the UE 200. For example, the machine learning may use measurements as inputs and compare an estimated location with a verified location of the UE 200 to refine an algorithm for determining the location estimate based on the measurements such that location estimate accuracy may be improved.

Referring to FIG. 10, with further reference to FIGS. 1-8, a method 1000 of facilitating position information determination includes the stages shown. The method 1000 is, however, an example and not limiting. The method 1000 may be altered, e.g., by having stages added, removed, rearranged, combined, performed concurrently, and/or having single stages split into multiple stages.

At stage 1010, the method 1000 includes receiving, at a base station, UL-PRS from a user equipment. For example, the UE 200 sends the PRS 511-516 to the TRP 300 via the paths 601-603 and the TRP 300 receives the PRS 511-516 from the UE 200. The processor 310, possibly in combination with the memory 311, and the transceiver 315 (e.g., the wireless receiver 344 and the antenna 346) may comprise means for receiving the UL-PRS.

At stage 1020, the method 1000 includes determining, at the base station, a plurality of measurement values of the UL-PRS, each of the plurality of measurement values being of a same type of measurement, and corresponding to the UL-PRS. For example, the UL-PRS reporting unit 360 determines multiple values of one or more measurement items (e.g., power (e.g., RSRP), Rx-Tx, ToA, AoA) for the same UL-PRS. For example, the UL-PRS reporting unit 360 determines multiple measurement values for the same arrival of the UL-PRS received by different antenna elements (in one or more antennas), or determines multiple values of the same UL-PRS for different arrivals of the UL-PRS (e.g., that traveled different paths), or a combination thereof. The processor 310, possibly in combination with the memory 311, may comprise means for determining the measurement values of the UL-PRS.

At stage 1030, the method 1000 includes sending, from the base station to a server, a report including the plurality of measurement values of the UL-PRS and at least one indication that the plurality of measurement values corresponds to a same UL-PRS. For example, the UL-PRS reporting unit 360 sends a measurement report, e.g., the measurement report 800 or another report, including multiple measurement values for the same UL-PRS and an indication that the measurements correspond to a single UL-PRS. The processor 310, possibly in combination with the memory 311, and the transceiver 315 (e.g., the wireless transmitter 342 and the antenna 346) may comprise means for sending the plurality of measurement values of the UL-PRS and the at least one indication. Sending the report provides information to the server that the server may use to determine a more accurate location estimate, especially in an NLOS condition, than without the information in the report.

Implementations of the method 1000 may include one or more of the following features. In an example implementation, the at least one indication comprises a same UL-PRS identifier for the plurality of measurement values of the UL-PRS, or a same timestamp value for the plurality of measurement values of the UL-PRS, or a combination thereof. For example, multiple measurement values in a measurement report may have the same corresponding measurement beam information and/or the same timestamp. In another example implementation, each of the plurality of measurement values of the UL-PRS corresponds to a respective one of a plurality of antenna elements of the base station. For example, the entries 811 and 815 of the measurement report 800 correspond to the same antenna element for multiple values of RSRP corresponding to different arrivals of the same PRS. In a further example implementation, each of the plurality of measurement values of the UL-PRS corresponds to a respective one of a plurality of paths of the same UL-PRS. For example, the entries 811 and 815 of the measurement report 800 correspond to the paths 601, 602. In a further example implementation, the report comprises a plurality of index sets each corresponding to a respective one of the plurality of measurement values of the UL-PRS and indicative of the respective one of the plurality of antenna elements and the respective one of the plurality of paths. For example, the index values for antenna element and path may be provided in the measurement report, e.g., as shown in FIG. 8. In a further example implementation, each of the index sets is further indicative of a measurement type of the respective one of the plurality of measurement values of the UL-PRS. For example, the indexes 810 include an indication of the measurement type (e.g., RSRP, Rx-Tx, ToA, AoA).

Also or alternatively, implementations of the method 1000 may include one or more of the following features. In an example implementation, each of the plurality of measurement values of the UL-PRS corresponds to a respective one of a plurality of paths of the same UL-PRS. In a further example implementation, each of the plurality of measurement values of the UL-PRS comprises a combination of other measurement values corresponding to the plurality of antenna elements. In a further example implementation, the other measurement values comprise power values and the combination is either a sum of the power values or an average of the power values. In another example implementation, each of the plurality of measurement values of the UL-PRS comprises a power value, or an angle of arrival value, or a time of arrival value, or a time difference value relative to a reference time, or any combination thereof. Thus, the measurement values may comprise, e.g., a power value and a time difference value, a power value and an AoA, etc. The reference time may be a time of signal transmission by the base station where the time difference value is an Rx-Tx value. The reference time may be a time of signal reception by the base station from a reference entity where the time difference value is an RSTD value.

Also or alternatively, implementations of the method 1000 may include one or more of the following features. In an example implementation, the plurality of the measurement values is a plurality of first measurement values and the report is sent with the plurality of first measurement values in the report ordered based on values of second measurement values that correspond to the plurality of first measurement values and that are omitted from the report. For example, the first measurement values are of one type (e.g., ToA) and are placed in the report in order of second measurement values of another type (e.g., power), e.g., ToA values placed in descending order of power values of the corresponding signals (i.e., used to determine the ToA values) with the power values not included in the report. The relative power values are thus implicit in the order of the ToA values. This may reduce overhead (channel traffic) by avoiding transmitting the second measurement values in the report. In another example implementation, the method 1000 comprises ordering the plurality of measurement values according to a sequence, received by the base station from the server, of respective combinations of antenna element and path corresponding to each of the plurality of measurement values. For example, the server 400 may send a measurement request to the TRP 300 and indicate in that request the order of measurement values for a measurement report to be sent by the TRP 300. The order may be indicated according to antenna element and path (e.g., antenna element 1, path 1, RSRP; antenna element 1, path 1, gNB Rx-Tx; . . . ). This may reduce overhead (channel traffic) by avoiding transmitting indications of the antenna element and path combinations in the report. The processor 310, possibly in combination with the memory 311, and the transceiver 315 (e.g., the wireless receiver 344 and the antenna 346) may comprise means for ordering the plurality of measurement values according to a sequence received from the server.

Implementation Examples

Implementation examples are provided in the following numbered clauses.

Clause 1. A base station comprising:

a transceiver;

a memory; and one or more processors communicatively coupled to the transceiver and the memory and configured to:

receive an uplink positioning reference signal from a user equipment via the transceiver;

determine a plurality of measurement values of the uplink positioning reference signal, each of the plurality of measurement values being of a same type of measurement, and corresponding to the uplink positioning reference signal; and send, via the transceiver to a server, a report including the plurality of measurement values of the uplink positioning reference signal and at least one indication that the plurality of measurement values corresponds to a same uplink positioning reference signal.

Clause 2. The base station of clause 1, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

Clause 3. The base station of clause 1, wherein the transceiver comprises a plurality of antenna elements, and wherein each of the plurality of measurement values of the uplink positioning reference signal corresponds to a respective one of the plurality of antenna elements.

Clause 4. The base station of clause 3, wherein each of the plurality of measurement values of the uplink positioning reference signal corresponds to a respective one of a plurality of paths of the same uplink positioning reference signal.

Clause 5. The base station of clause 4, wherein the report comprises a plurality of index sets each corresponding to a respective one of the plurality of measurement values of the uplink positioning reference signal and indicative of the respective one of the plurality of antenna elements and the respective one of the plurality of paths.

Clause 6. The base station of clause 5, wherein each of the plurality of index sets is further indicative of a measurement type of the respective one of the plurality of measurement values of the uplink positioning reference signal.

Clause 7. The base station of clause 1, wherein each of the plurality of measurement values of the uplink positioning reference signal corresponds to a respective one of a plurality of paths of the same uplink positioning reference signal.

Clause 8. The base station of clause 7, wherein the transceiver comprises a plurality of antenna elements, and wherein each of the plurality of measurement values of the uplink positioning reference signal comprises a combination of other measurement values corresponding to the plurality of antenna elements.

Clause 9. The base station of clause 8, wherein the other measurement values comprise power values and the combination of other measurement values corresponding to the plurality of antenna elements is either a sum of the power values or an average of the power values.

Clause 10. The base station of clause 1, wherein each of the plurality of measurement values of the uplink positioning reference signal comprises a power value, or an angle of arrival value, or a time of arrival value, or a time difference value relative to a reference time, or any combination thereof.

Clause 11. The base station of clause 1, wherein the plurality of measurement values is a plurality of first measurement values, and wherein the one or more processors are configured to order the plurality of first measurement values in the report based on values of second measurement values that correspond to the plurality of first measurement values and that are omitted from the report.

Clause 12. A method of reporting measurements of an uplink positioning reference signal, the method of reporting measurements of the uplink positioning reference signal comprising:

receiving, at a base station, the uplink positioning reference signal from a user equipment;

determining, at the base station, a plurality of measurement values of the uplink positioning reference signal, each of the plurality of measurement values being of a same type of measurement, and corresponding to the uplink positioning reference signal; and sending, from the base station to a server, a report including the plurality of measurement values of the uplink positioning reference signal and at least one indication that the plurality of measurement values corresponds to a same uplink positioning reference signal.

Clause 13. The method of reporting measurements of the uplink positioning reference signal of clause 12, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

Clause 14. The method of reporting measurements of the uplink positioning reference signal of clause 12, wherein each of the plurality of measurement values of the uplink positioning reference signal corresponds to a respective one of a plurality of antenna elements of the base station.

Clause 15. The method of reporting measurements of the uplink positioning reference signal of clause 14, wherein each of the plurality of measurement values of the uplink positioning reference signal corresponds to a respective one of a plurality of paths of the same uplink positioning reference signal.

Clause 16. The method of reporting measurements of the uplink positioning reference signal of clause 15, wherein the report comprises a plurality of index sets each corresponding to a respective one of the plurality of measurement values of the uplink positioning reference signal and indicative of the respective one of the plurality of antenna elements and the respective one of the plurality of paths.

Clause 17. The method of reporting measurements of the uplink positioning reference signal of clause 16, wherein each of the plurality of index sets is further indicative of a measurement type of the respective one of the plurality of measurement values of the uplink positioning reference signal.

Clause 18. The method of reporting measurements of the uplink positioning reference signal of clause 12, wherein each of the plurality of measurement values of the uplink positioning reference signal corresponds to a respective one of a plurality of paths of the same uplink positioning reference signal.

Clause 19. The method of reporting measurements of the uplink positioning reference signal of clause 18, wherein each of the plurality of measurement values of the uplink positioning reference signal comprises a combination of other measurement values corresponding to a plurality of antenna elements of the base station.

Clause 20. The method of reporting measurements of the uplink positioning reference signal of clause 19, wherein the other measurement values comprise power values and the combination of other measurement values corresponding to the plurality of antenna elements is either a sum of the power values or an average of the power values.

Clause 21. The method of reporting measurements of the uplink positioning reference signal of clause 12, wherein each of the plurality of measurement values of the uplink positioning reference signal comprises a power value, or an angle of arrival value, or a time of arrival value, or a time difference value relative to a reference time, or any combination thereof.

Clause 22. The method of reporting measurements of the uplink positioning reference signal of clause 12, wherein the plurality of measurement values is a plurality of first measurement values, and wherein the report is sent with the plurality of first measurement values in the report ordered based on values of second measurement values that correspond to the plurality of first measurement values and that are omitted from the report.

Clause 23. The method of reporting measurements of the uplink positioning reference signal of clause 12, further comprising ordering the plurality of measurement values in the report according to a sequence, received by the base station from the server, of respective combinations of antenna element and path corresponding to each of the plurality of measurement values.

Clause 24. A base station comprising:

means for receiving an uplink positioning reference signal from a user equipment;

means for determining a plurality of measurement values of the uplink positioning reference signal, each of the plurality of measurement values being of a same type of measurement, and corresponding to the uplink positioning reference signal; and means for sending, to a server, a report including the plurality of measurement values of the uplink positioning reference signal and at least one indication that the plurality of measurement values corresponds to a same uplink positioning reference signal.

Clause 25. The base station of clause 24, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

Clause 26. The base station of clause 24, wherein each of the plurality of measurement values of the uplink positioning reference signal corresponds to a respective one of a plurality of antenna elements of the base station.

Clause 27. The base station of clause 26, wherein each of the plurality of measurement values of the uplink positioning reference signal corresponds to a respective one of a plurality of paths of the same uplink positioning reference signal.

Clause 28. The base station of clause 27, wherein the report comprises a plurality of index sets each corresponding to a respective one of the plurality of measurement values of the uplink positioning reference signal and indicative of the respective one of the plurality of antenna elements and the respective one of the plurality of paths.

Clause 29. The base station of clause 28, wherein each of the plurality of index sets is further indicative of a measurement type of the respective one of the plurality of measurement values of the uplink positioning reference signal.

Clause 30. The base station of clause 24, wherein each of the plurality of measurement values of the uplink positioning reference signal corresponds to a respective one of a plurality of paths of the same uplink positioning reference signal.

Clause 31. The base station of clause 30, wherein each of the plurality of measurement values of the uplink positioning reference signal comprises a combination of other measurement values corresponding to a plurality of antenna elements of the base station.

Clause 32. The base station of clause 31, wherein the other measurement values comprise power values and the combination of other measurement values corresponding to the plurality of antenna elements is either a sum of the power values or an average of the power values.

Clause 33. The base station of clause 24, wherein each of the plurality of measurement values of the uplink positioning reference signal comprises a power value, or an angle of arrival value, or a time of arrival value, or a time difference value relative to a reference time, or any combination thereof.

Clause 34. The base station of clause 24, wherein the plurality of measurement values is a plurality of first measurement values, and wherein the means for sending the report comprise means for sending the report with the plurality of first measurement values in the report ordered based on values of second measurement values that correspond to the plurality of first measurement values and that are omitted from the report.

Clause 35. The base station of clause 24, further comprising means for ordering the plurality of measurement values in the report according to a sequence, received by the base station from the server, of respective combinations of antenna element and path corresponding to each of the plurality of measurement values.

Clause 36. The base station of clause 24, wherein each of the plurality of measurement values of the uplink positioning reference signal corresponds to a respective one of a plurality of paths of the same uplink positioning reference signal.

Clause 37. The base station of clause 24, wherein each of the plurality of measurement values of the uplink positioning reference signal corresponds to a respective one of a plurality of antenna elements of the base station and to a respective one of a plurality of paths of the same uplink positioning reference signal, and wherein the report comprises a plurality of index sets each corresponding to a respective one of the plurality of measurement values of the uplink positioning reference signal and indicative of the respective one of the plurality of antenna elements and the respective one of the plurality of paths.

Clause 38. A non-transitory, processor-readable storage medium comprising processor-readable instructions configured to cause one or more processors of a base station, in order to facilitate reporting measurements of an uplink positioning reference signal, to:

receive the uplink positioning reference signal from a user equipment;

determine a plurality of measurement values of the uplink positioning reference signal, each of the plurality of measurement values being of a same type of measurement, and corresponding to the uplink positioning reference signal; and send, to a server, a report the plurality of measurement values of the uplink positioning reference signal and at least one indication that the plurality of measurement values corresponds to a same uplink positioning reference signal.

Clause 39. The storage medium of clause 38, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

Clause 40. The storage medium of clause 38, wherein each of the plurality of measurement values of the uplink positioning reference signal corresponds to a respective one of a plurality of antenna elements of the base station.

Clause 41. The storage medium of clause 40, wherein each of the plurality of measurement values of the uplink positioning reference signal corresponds to a respective one of a plurality of paths of the same uplink positioning reference signal.

Clause 42. The storage medium of clause 41, wherein the report comprises a plurality of index sets each corresponding to a respective one of the plurality of measurement values of the uplink positioning reference signal and indicative of the respective one of the plurality of antenna elements and the respective one of the plurality of paths.

Clause 43. The storage medium of clause 42, wherein each of the plurality of index sets is further indicative of a measurement type of the respective one of the plurality of measurement values of the uplink positioning reference signal.

Clause 44. The storage medium of clause 38, wherein each of the plurality of measurement values of the uplink positioning reference signal corresponds to a respective one of a plurality of paths of the same uplink positioning reference signal.

Clause 45. The storage medium of clause 44, wherein each of the plurality of measurement values of the uplink positioning reference signal comprises a combination of other measurement values corresponding to a plurality of antenna elements of the base station.

Clause 46. The storage medium of clause 45, wherein the other measurement values comprise power values and the combination of other measurement values corresponding to the plurality of antenna elements is either a sum of the power values or an average of the power values.

Clause 47. The storage medium of clause 38, wherein each of the plurality of measurement values of the uplink positioning reference signal comprises a power value, or an angle of arrival value, or a time of arrival value, or a time difference value relative to a reference time, or any combination thereof.

Clause 48. The storage medium of clause 38, wherein the plurality of measurement values is a plurality of first measurement values, and wherein the processor-readable instructions configured to cause the one or more processors to send the report comprise processor-readable instructions configured to cause the one or more processors to send the report with the plurality of first measurement values in the report ordered based on values of second measurement values that correspond to the plurality of first measurement values and that are omitted from the report.

Clause 49. The storage medium of clause 38, further comprising processor-readable instructions configured to cause the one or more processors to order the plurality of measurement values in the report according to a sequence, received by the base station from the server, of respective combinations of antenna element and path corresponding to each of the plurality of measurement values.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A base station comprising:
   a transceiver;
   a memory; and
   one or more processors communicatively coupled to the transceiver and the memory and configured to:
   receive an uplink positioning reference signal from a user equipment via the transceiver;
   determine a plurality of measurement values of the uplink positioning reference signal, each of the plurality of measurement values being of a same type of measurement, and corresponding to the uplink positioning reference signal; and
   send, via the transceiver to a server, a report including the plurality of measurement values of the uplink positioning reference signal and at least one indication that the plurality of measurement values corresponds to a same uplink positioning reference signal.

2. The base station of claim 1, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

3. The base station of claim 1, wherein the transceiver comprises a plurality of antenna elements, and wherein each of the plurality of measurement values of the uplink positioning reference signal corresponds to a respective one of the plurality of antenna elements.

4. The base station of claim 3, wherein each of the plurality of measurement values of the uplink positioning reference signal corresponds to a respective one of a plurality of paths of the same uplink positioning reference signal.

5. The base station of claim 4, wherein the report comprises a plurality of index sets each corresponding to a respective one of the plurality of measurement values of the uplink positioning reference signal and indicative of the respective one of the plurality of antenna elements and the respective one of the plurality of paths.

6. The base station of claim 5, wherein each of the plurality of index sets is further indicative of a measurement type of the respective one of the plurality of measurement values of the uplink positioning reference signal.

7. The base station of claim 1, wherein each of the plurality of measurement values of the uplink positioning reference signal corresponds to a respective one of a plurality of paths of the same uplink positioning reference signal.

8. The base station of claim 7, wherein the transceiver comprises a plurality of antenna elements, and wherein each of the plurality of measurement values of the uplink positioning reference signal comprises a combination of other measurement values corresponding to the plurality of antenna elements.

9. The base station of claim 8, wherein the other measurement values comprise power values and the combination of other measurement values corresponding to the plurality of antenna elements is either a sum of the power values or an average of the power values.

10. The base station of claim 1, wherein each of the plurality of measurement values of the uplink positioning reference signal comprises a power value, or an angle of arrival value, or a time of arrival value, or a time difference value relative to a reference time, or any combination thereof.

11. The base station of claim 1, wherein the plurality of measurement values is a plurality of first measurement values, and wherein the one or more processors are configured to order the plurality of first measurement values in the report based on values of second measurement values that correspond to the plurality of first measurement values and that are omitted from the report.

12. A method of reporting measurements of an uplink positioning reference signal, the method of reporting measurements of an uplink positioning reference signal comprising:
  receiving, at a base station, the uplink positioning reference signal from a user equipment;
  determining, at the base station, a plurality of measurement values of the uplink positioning reference signal, each of the plurality of measurement values being of a same type of measurement, and corresponding to the uplink positioning reference signal; and
  sending, from the base station to a server, a report including the plurality of measurement values of the uplink positioning reference signal and at least one indication that the plurality of measurement values corresponds to a same uplink positioning reference signal.

13. The method of reporting measurements of an uplink positioning reference signal of claim 12, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

14. The method of reporting measurements of an uplink positioning reference signal of claim 12, wherein each of the plurality of measurement values of the uplink positioning reference signal corresponds to a respective one of a plurality of antenna elements of the base station.

15. The method of reporting measurements of an uplink positioning reference signal of claim 14, wherein each of the plurality of measurement values of the uplink positioning reference signal corresponds to a respective one of a plurality of paths of the same uplink positioning reference signal.

16. The method of reporting measurements of an uplink positioning reference signal of claim 15, wherein the report comprises a plurality of index sets each corresponding to a respective one of the plurality of measurement values of the uplink positioning reference signal and indicative of the respective one of the plurality of antenna elements and the respective one of the plurality of paths.

17. The method of reporting measurements of an uplink positioning reference signal of claim 16, wherein each of the plurality of index sets is further indicative of a measurement type of the respective one of the plurality of measurement values of the uplink positioning reference signal.

18. The method of reporting measurements of an uplink positioning reference signal of claim 12, wherein each of the plurality of measurement values of the uplink positioning reference signal corresponds to a respective one of a plurality of paths of the same uplink positioning reference signal.

19. The method of reporting measurements of an uplink positioning reference signal of claim 18, wherein each of the plurality of measurement values of the uplink positioning reference signal comprises a combination of other measurement values corresponding to a plurality of antenna elements of the base station.

20. The method of reporting measurements of an uplink positioning reference signal of claim 19, wherein the other measurement values comprise power values and the combination of other measurement values corresponding to the plurality of antenna elements is either a sum of the power values or an average of the power values.

21. The method of reporting measurements of an uplink positioning reference signal of claim 12, wherein each of the plurality of measurement values of the uplink positioning reference signal comprises a power value, or an angle of arrival value, or a time of arrival value, or a time difference value relative to a reference time, or any combination thereof.

22. The method of reporting measurements of an uplink positioning reference signal of claim 12, wherein the plurality of measurement values is a plurality of first measurement values, and wherein the report is sent with the plurality of first measurement values in the report ordered based on values of second measurement values that correspond to the plurality of first measurement values and that are omitted from the report.

23. The method of reporting measurements of an uplink positioning reference signal of claim 12, further comprising ordering the plurality of measurement values in the report according to a sequence, received by the base station from the server, of respective combinations of antenna element and path corresponding to each of the plurality of measurement values.

24. A base station comprising:
  means for receiving an uplink positioning reference signal from a user equipment;
  means for determining a plurality of measurement values of the uplink positioning reference signal, each of the plurality of measurement values being of a same type of measurement, and corresponding to the uplink positioning reference signal; and
  means for sending, to a server, a report including the plurality of measurement values of the uplink positioning reference signal and at least one indication that the plurality of measurement values corresponds to a same uplink positioning reference signal.

25. The base station of claim 24, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

26. The base station of claim 24, wherein each of the plurality of measurement values of the uplink positioning reference signal corresponds to a respective one of a plurality of antenna elements of the base station.

27. The base station of claim 24, wherein each of the plurality of measurement values of the uplink positioning reference signal corresponds to a respective one of a plurality of paths of the same uplink positioning reference signal.

28. The base station of claim 24, wherein each of the plurality of measurement values of the uplink positioning reference signal corresponds to a respective one of a plurality of antenna elements of the base station and to a respective one of a plurality of paths of the same uplink positioning reference signal, and wherein the report comprises a plurality of index sets each corresponding to a respective one of the plurality of measurement values of the uplink positioning reference signal and indicative of the respective one of the plurality of antenna elements and the respective one of the plurality of paths.

29. A non-transitory, processor-readable storage medium comprising processor-readable instructions configured to cause one or more processors of a base station, in order to facilitate reporting measurements of an uplink positioning reference signal, to:
  receive the uplink positioning reference signal from a user equipment;
  determine a plurality of measurement values of the uplink positioning reference signal, each of the plurality of measurement values being of a same type of measurement, and corresponding to the uplink positioning reference signal; and
  send, to a server, a report the plurality of measurement values of the uplink positioning reference signal and at least one indication that the plurality of measurement values corresponds to a same uplink positioning reference signal.

30. The storage medium of claim 29, wherein the at least one indication comprises a same uplink positioning reference signal identifier for the plurality of measurement values of the uplink positioning reference signal, or a same timestamp value for the plurality of measurement values of the uplink positioning reference signal, or a combination thereof.

* * * * *